US008814392B1

(12) United States Patent
Lipowsky et al.

(10) Patent No.: US 8,814,392 B1
(45) Date of Patent: Aug. 26, 2014

(54) HYBRID LENS FOR SOLID STATE LIGHT SOURCE DEVICE

(71) Applicants: Peter Lipowsky, Munich (DE); Henrike Streppel, Regensburg (DE)

(72) Inventors: Peter Lipowsky, Munich (DE); Henrike Streppel, Regensburg (DE)

(73) Assignee: OSRAM SYLVANIA Inc., Danvers, MA (US)

( * ) Notice: Subject to any disclaimer, the term of this patent is extended or adjusted under 35 U.S.C. 154(b) by 17 days.

(21) Appl. No.: 13/785,014

(22) Filed: Mar. 5, 2013

(51) Int. Cl.
*F21V 3/00* (2006.01)
*G02B 1/10* (2006.01)

(52) U.S. Cl.
CPC ....................... *G02B 1/105* (2013.01)
USPC ....... 362/311.02; 362/326; 359/599; 359/707

(58) Field of Classification Search
USPC ....................... 362/311.02, 326; 359/599, 707
See application file for complete search history.

(56) References Cited

U.S. PATENT DOCUMENTS

| 4,700,278 | A | 10/1987 | Chew | |
|---|---|---|---|---|
| 7,888,883 | B2 | 2/2011 | Crawford et al. | |
| 7,972,042 | B2 * | 7/2011 | Lin et al. | 362/335 |
| 8,324,836 | B2 | 12/2012 | Crawford et al. | |
| 8,351,119 | B2 * | 1/2013 | Yang et al. | 359/599 |
| 2011/0305024 | A1 * | 12/2011 | Chang | 362/294 |

\* cited by examiner

*Primary Examiner* — Ali Alavi
(74) *Attorney, Agent, or Firm* — Shaun P. Montana; William H. McNeill

(57) ABSTRACT

A hybrid lens for a solid state light source device is provided. The hybrid lens includes a first component and a second component. The first component has a first side and a second side oppositely disposed thereto. The first side is positioned facing a solid state light source. The second component is attached to the first side of the first component. The first component includes a flame retardant material, such as a glass or a filled polymer. The second component includes a non-flame retardant material, such as an unfilled polymer.

20 Claims, 1 Drawing Sheet

HYBRID LENS FOR SOLID STATE LIGHT SOURCE DEVICE

TECHNICAL FIELD

The present invention relates to lighting, and more specifically, to optics for one or more solid state light sources and/or devices including the same.

BACKGROUND

An increasing number of lighting devices employ one or more solid state light sources, such as but not limited to light emitting diodes (LEDs) and their many cousins (e.g., organic LEDs, polymer LEDs, etc). As solid state light sources are energized by direct current (DC) and the lighting devices including the solid state light sources are typically intended for use in situations where the available power source is alternating current (AC), it is not uncommon for the device to include integrated electronics to convert AC to DC to operate the solid state light source(s).

In the United States, such devices must meet the Underwriters Laboratories (UL) standards defined in notices 1993 and 8750, which require that the enclosure for such devices meet the flame-retardant requirements set forth in UL94, Class V-O. In directional devices, such as but not limited to lamps, it is not unusual for the exterior optic (for example but not limited to a lens) to be a part of the enclosure and, therefore, the optic also must meet these requirements.

SUMMARY

While, in principal, an optic made of glass would fulfill the UL requirements described above, it is not currently possible to make a glass optic that has the necessary precision at an acceptable price. Thus, it is common for solid state light source devices to use an optic made of one or more polymers instead. Among the sufficiently transparent polymer materials, only polycarbonates (PC) that include certain filling materials meet the flame-retardant requirements. However, such filled PC material is notably less transparent than the unfilled PC, which can be optimized for optical applications. The filled material that can meet the UL94, Class V-O requirements, while useable, will always provide a device having a light output that is from 5 to 10 percent lower than a device with an unfilled material. Additionally, a PC material filled with flame-retardants will turn yellow much faster, due to the blue component of the spectrum in white-light emitting solid state light sources.

Embodiments of the invention overcome these disadvantages by providing for a hybrid lens that is made of flame retardant material (e.g., a filled polymer, glass, etc.) that complies with the UL94, Class V-O requirements, and a material that does not comply with those requirements (e.g., an unfilled polymer). The hybrid lens is arranged as part of a solid state light source device such that the portion of the hybrid lens made from the flame retardant material is on an exterior surface of the device, providing the protection required by the UL requirements. The portion of the hybrid lens that does not comply with the UL94, Class V-O flame retardant requirements is on the interior of the device, closer in proximity to the solid state light source(s). The hybrid lens thus serves the dual purpose of maximizing light output from the solid state light source(s) while fulfilling the relevant UL requirements.

In an embodiment, there is provided a hybrid lens for a solid state light source device. The hybrid lens includes a first component having a first side and a second side oppositely disposed thereto. The first side is positioned facing a solid state light source. The hybrid lens also includes a second component attached to the first side of the first component. The first component includes a flame retardant material, and the second component includes a non-flame retardant material.

In a related embodiment, the flame retardant material of the first component may include glass. In a further related embodiment, the non-flame retardant material of the second component may include an unfilled polymer. In a further related embodiment, the unfilled polymer may include an unfilled polycarbonate. In another further related embodiment, the unfilled polymer may include an unfilled polymethylmethacrylate. In yet another further related embodiment, the unfilled polymer may include a combination of an unfilled polycarbonate and an unfilled polymethylmethacrylate.

In another related embodiment, the flame retardant material of the first component may include a polymer containing a fill of flame retardant materials.

In a further related embodiment, the non-flame retardant material of the second component may include an unfilled polymer. In a further related embodiment, the unfilled polymer may include an unfilled polycarbonate. In another further related embodiment, the unfilled polymer may include an unfilled polymethylmethacrylate. In still another further related embodiment, the unfilled polymer may include a combination of an unfilled polycarbonate and an unfilled polymethylmethacrylate.

In a further related embodiment, the flame retardant material of the first component may include a polycarbonate containing a fill of flame retardant materials. In a further related embodiment, the non-flame retardant material of the second component may include an unfilled polymer. In a further related embodiment, the unfilled polymer may include an unfilled polycarbonate. In another further related embodiment, the unfilled polymer may include an unfilled polymethylmethacrylate. In yet another further related embodiment, the unfilled polymer may include a combination of an unfilled polycarbonate and an unfilled polymethylmethacrylate.

In another related embodiment, the first component may be shaped correspondingly with the second component. In yet another related embodiment, the first component may be shaped differently from the second component. In still another related embodiment, the first component may include, at least in part, an enclosure of the solid state light source device.

In another embodiment, there is provided a hybrid lens for solid state light source device. The hybrid lens includes a first component having a first side positioned facing a solid state light source and an oppositely disposed second side, and a second component fixed to the first side of the first component, wherein at least the first component is flame-retardant.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Figure 1:
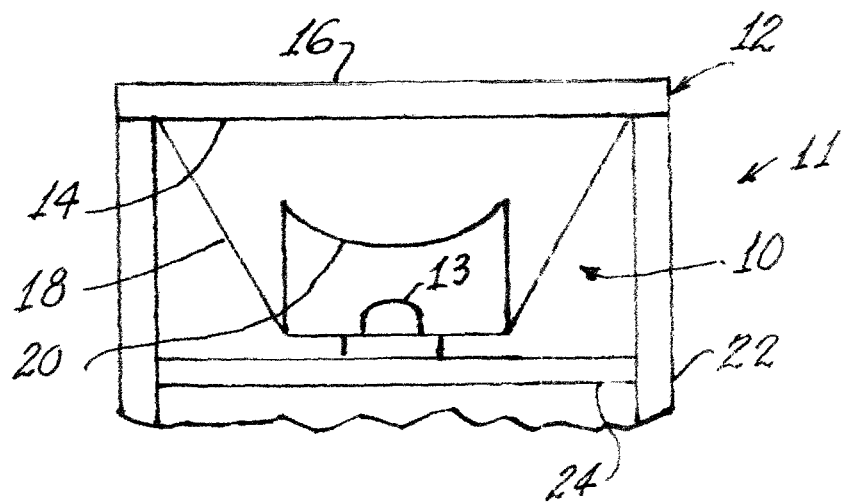
FIG. 1 shows a solid state light source device including a hybrid lens according to embodiments disclosed herein.

For purposes of this application, it is to be understood that when an element or layer is referred to as being "on," connected to" or "coupled to" another element or layer, it can be directly on, connected to or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. The term "and/or" includes any and all combinations of one or more of the associated listed items.

Although the terms "first," "second," "third" etc. may be used to describe various elements, components, regions, layers and/or sections, these elements, components, regions, layers and/or sections are not to be limited by theses terms as they are used only to distinguish one element, component, region, layer or section from another element, component, region, layer or section. Thus, a first element, component, region, layer or section could be termed a second element, component, region, layer or section without departing from the scope and teachings of the present invention.

Spatially relative terms, such as "beneath," below," upper," "lower," "above" and the like may be used herein for ease of description to describe one element or feature's relationship to another element(s) or feature(s) as illustrated in the drawings. These spatially relative terms are intended to encompass different orientations of the device in use or operation in addition to the orientation shown in the drawings. For example, if the device in the drawings is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

As used throughout, the terms "flame retardant" or "flame retardancy" refer to materials meeting the requisite UL requirement for the intended purpose. The term "unfilled", as used throughout, refers to a material (e.g., a polymer) that does not include a fill of flame retardant material.

FIG. 1 shows a hybrid lens 10 for a solid state light source device 11. The hybrid lens 10 comprises a first component 12 having a first side 14. The first side 14 faces a solid state light source 13. Though the drawings show only a single solid state light source 13, of course embodiments are not so limited and thus in some embodiments, the solid state light source 13 comprises a plurality of solid state light sources. The first component 12 also has a second side 16 that is opposite the first side 14. For example, as shown in FIG. 1, the second side 16 is on an exterior of the solid state light source device 11. The hybrid lens 10 also comprises a second component 18. The second component 18 is fixed or otherwise attached to the first side 14 of the first component 12.

At least the first component 12 is flame-retardant, that is, at least the first component 12 is comprised of one or more flame-retardant materials that meet the requisite UL requirements, such as but not limited to those discussed above. In some embodiments, the first component 12 comprises a glass, such as but not limited to an optical glass. In some embodiments, the first component 12 comprises a polymer that contains a fill of flame retardant materials. In some embodiments, the polymer of the first component 12 comprises a polycarbonate. In some embodiments, the second component 18 is comprises of one or more non-flame retardant materials, that is, a material that does not meet the requisite UL requirements, such as but not limited to those discussed above. In some embodiments, the second component 18 comprises an unfilled polymer. In some embodiments, the unfilled polymer comprises an unfilled polycarbonates. In some embodiments, the unfilled polymer comprises an unfilled polymethylmethacrylates. In some embodiments, the unfilled polymer comprises a combination of two or more unfilled polymers, such as but not limited to unfilled polycarbonates, unfilled polymethylmethcrylates, and combinations thereof.

Figure 2:
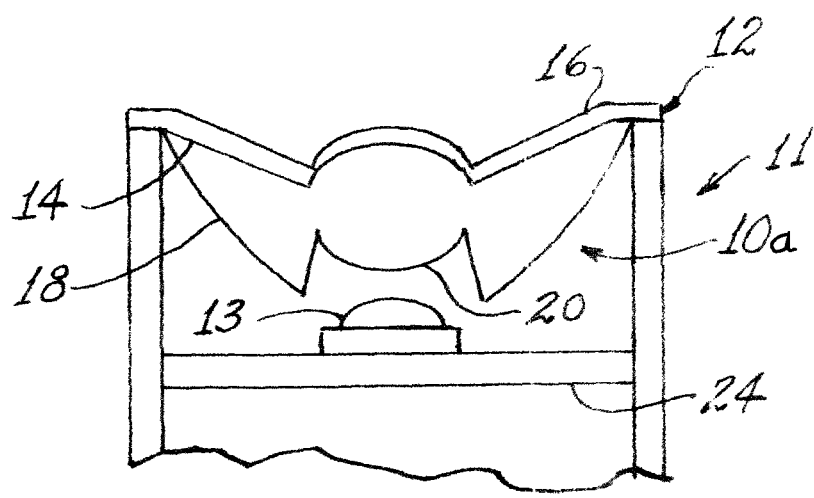
FIG. 2 shows a solid state light source device including a hybrid lens having an alternate construction, according to embodiments disclosed herein.

The hybrid lens 10 may, and in some embodiments does, take any shape suitable for complying with the requisite UL requirements, such as but not limited to those described above. For example, as shown in FIG. 1, the hybrid lens 10 has a flat portion, corresponding to the first component 12, and a conical portion with a convex opening for the solid state light source 13, corresponding to the second component 18. Thus, in some embodiments, the first component 12 is shaped differently from the second component 18. In contrast is FIG. 2, which shown a hybrid lens 10a including the same elements as the hybrid lens 10 of FIG. 1, but where the first component 12 is shaped corresponding with the second component 18. That is, in FIG. 2, the second component 18 of the hybrid lens 10a has a batwing shape and the first component 12 of the hybrid lens 10a has a shape that matches an upper portion of the batwing shape of the second component 18. Though particular shapes of the hybrid lens 10 and the hybrid lens 10a are shown in FIGS. 1 and 2, of course the hybrid lens 10 and the hybrid lens 10a may take any known shape.

In some embodiments, the first component 12 is as thin as possible to keep optical losses of light emitted from the solid state light source 13 low while still meeting the necessary flame-retardant UL requirements. In some embodiments, to reduce optical losses at an interface between the first component 12 and the second component 18, the hybrid lens 10 is produced by, for example but not limited to, injection molding when the first component 12 and the second component 18 are both polymers, or for example by overmolding a preformed first component 12 with the second component 18, when the first component 12 is a glass and the second component is a polymer.

Thus, there is produced a reliable and relatively inexpensive lens and enclosure combination that meets UL safety requirements regarding flame retardancy. The second optical component can be chosen to meet superb optical requirements without being limited by the UL flame retardant requirements.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A hybrid lens for a solid state light source device, comprising:
    a first component having a first side and a second side oppositely disposed thereto, wherein the first side is positioned facing a solid state light source; and
    a second component attached to the first side of the first component;
    wherein the first component comprises a flame retardant material, and wherein the second component comprises a non-flame retardant material.

2. The hybrid lens of claim 1, wherein the flame retardant material of the first component comprises glass.

3. The hybrid lens of claim 2, wherein the non-flame retardant material of the second component comprises an unfilled polymer.

4. The hybrid lens of claim 3, wherein the unfilled polymer comprises an unfilled polycarbonate.

5. The hybrid lens of claim 3, wherein the unfilled polymer comprises an unfilled polymethylmethacrylate.

6. The hybrid lens of claim 3, wherein the unfilled polymer comprises a combination of an unfilled polycarbonate and an unfilled polymethylmethacrylate.

7. The hybrid lens of claim 1, wherein the flame retardant material of the first component comprises a polymer containing a fill of flame retardant materials.

8. The hybrid lens of claim 7, wherein the non-flame retardant material of the second component comprises an unfilled polymer.

9. The hybrid lens of claim 8, wherein the unfilled polymer comprises an unfilled polycarbonate.

10. The hybrid lens of claim 8, wherein the unfilled polymer comprises an unfilled polymethylmethacrylate.

11. The hybrid lens of claim 8, wherein the unfilled polymer comprises a combination of an unfilled polycarbonate and an unfilled polymethylmethacrylate.

12. The hybrid lens of claim 7, wherein the flame retardant material of the first component comprises a polycarbonate containing a fill of flame retardant materials.

13. The hybrid lens of claim 12, wherein the non-flame retardant material of the second component comprises an unfilled polymer.

14. The hybrid lens of claim 13, wherein the unfilled polymer comprises an unfilled polycarbonate.

15. The hybrid lens of claim 13, wherein the unfilled polymer comprises an unfilled polymethylmethacrylate.

16. The hybrid lens of claim 13, wherein the unfilled polymer comprises a combination of an unfilled polycarbonate and an unfilled polymethylmethacrylate.

17. The hybrid lens claim 1, wherein the first component is shaped correspondingly with the second component.

18. The hybrid lens of claim 1, wherein the first component is shaped differently from the second component.

19. The hybrid lens claim 1, wherein the first component comprises, at least in part, an enclosure of the solid state light source device.

20. A hybrid lens for a solid state light source device, comprising:
    a first component having a first side positioned facing a solid state light source and an oppositely disposed second side; and
    a second component fixed to the first side of the first component;
    wherein at least the first component is flame-retardant.

* * * * *